June 21, 1949.  W. B. M. CLARK  2,473,939
POLARIZED ELECTROMAGNET
Filed Oct. 22, 1945

INVENTOR
Winslow B. M. Clark
BY Henry Lanahan
ATTORNEY

Patented June 21, 1949

2,473,939

UNITED STATES PATENT OFFICE 2,473,939

POLARIZED ELECTROMAGNET

Winslow B. M. Clark, West Orange, N. J., assignor to Thomas A. Edison, Incorporated, West Orange, N. J., a corporation of New Jersey Application October 22, 1945, Serial No. 623,795

6 Claims. (Cl. 175—339)

1

This invention relates to meter-type electrical instruments and more particularly to instruments of this character which use permanent-magnet rotors. By way of illustration, the invention is herein shown and described in terms of a sensitive meter relay, but it will be understood that in many of its features the invention has application as well to electrical measuring instruments.

Certain features of the present illustrative embodiment of my invention are described and claimed in the pending Fox application Serial No. 540,363, filed June 14, 1944, now Patent No. 2,439,970, granted April 20, 1948, and having a common assignee with the present application.

It is an object of my invention to provide improvements in the construction of meter-type electrical instruments of the character mentioned.

It is another object to provide a meter relay of the moving magnet type which is characterized as having a high sensitivity, a highly dependable operation and a simple and economical construction.

Further objects of my invention are to provide an improved construction of electrical instrument of the moving-magnet type wherein both jewel bearings are removable without disturbing the mounting of the shield or field coils, the shield is accurately located in symmetrical relation to the pivot axis of the rotor and the rotor is removable without disturbing the mounting of the field coils and shield.

These and other objects and features of my invention will be apparent from the following description and the appended claims.

In the description of my invention reference is had to the accompanying drawings, of which:

Figure 1:
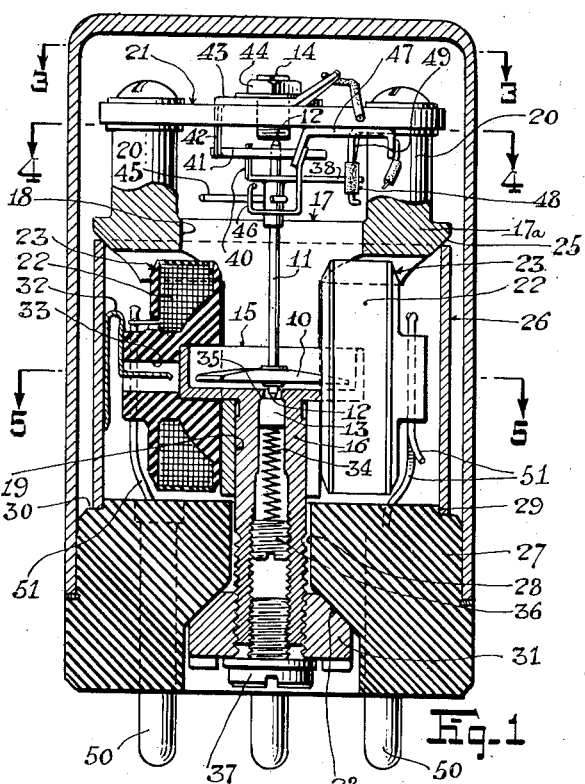
Figure 1 is a principally axially sectional view of a meter relay according to my invention.

The meter relay shown in the accompanying figures comprises a magnet 10, preferably of a bar shape as shown, mounted on a shaft 11. The shaft has pivots 12 at the ends thereof which pivotally engage lower and upper bearings 13 and 14 typically of the V jewel type. The magnet

2 is positioned within a damping cup 15 made of a conductive material such as copper or brass. This damping cup has a depending tubular stem 16 in which is mounted the lower jewel 13. The damping cup is housed in a frame member 17, preferably an aluminum casting, which has an axial opening 18 of enlarged diameter extending partially therethrough and an axial opening 19 of reduced diameter extending through the remaining length thereof. The damping cup 15 is positioned at the bottom of the enlarged axial opening 18 and the stem 16 snugly fits the smaller opening 19 and projects beyond the bottom wall of the frame member. The frame member has a circular head 17a provided with two upstanding posts 20. These posts support the bridge 21 in which is threaded the top jewel 14. Below the head 17a the frame member is provided with a narrow portion 17b having flat parallel sides opposite the pivot axis of the rotor. In the side spaces below the head 17a there are two field coils 22 having spools 23 seated against the opposite sides of the frame portion 17b. These spools have recesses 24 in their inner side walls which are engaged by portions of the damping cup 15 which overhang the frame portion 17b. By this engagement of the damping cup with the spools the coils are accurately located.

The width of the frame portion 17b is preferably at least as great as the width of the magnet 10. Thus, upon removing the bridge 21 and turning the magnet to a position wherein its longitudinal geometrical axis is parallel with the field coils, the magnet may be lifted out of the housing through the opening 18 while the coils are in their mounted positions.

The bottom face of the head 17a of the frame member is conical to provide a seat 25 for one end of a tubular magnetic shield 26. Below the frame member there is a circular base 27 of insulating material having a central opening 28 for receiving the stem 16. This base has an annular shoulder 29 snugly fitting the interior wall of the shield 26 and has an annular face 30 in a plane at right angles to the pivot axis of the instrument which abuts against the end of the shield, this shoulder and face constituting a seat for the lower end of the shield. The opening 28 is countersunk at 28a, and threaded exteriorly onto the stem 16 is a conical nut 31 which engages this countersink to clamp the base 27 tightly against the shield and to centralize the base relative to the pivot axis and retain it at right angles thereto.

While I have described the base 27 as having the annular shoulder 29 I may rely wholly on the annular face 30 for localizing the shield at the bottom, in which case I may dispense with the shoulder. However, when the face 30 is used as the sole means for localizing the shield at the bottom, it is important that both end faces of the shield be parallel to one another in planes at right angles to the center axis of the shield.

Between the coil spools 23 and shield 26 there are U-springs 32 for holding the spools seated against the frame member. These springs have inwardly-extending end portions which engage axial holes 33 in the spools for retaining the springs in place.

The jewel 13 is urged upwardly by a spring 34 against an internal seat 35 within the stem 16, the spring 34 being backed by a screw 36 which is threaded into the stem. Threaded into the outer portion of the stem is a headed screw 37 which bears against the nut 31 to lock the latter in place.

It will be seen that in the above construction the bottom jewel 13 may be removed simply by unthreading the screws 37 and 36 without loosening the base 27 or disturbing the mounting of the shield or coils. This is very advantageous since it permits replacement of the jewel without disturbing the calibration or adjustment of the instrument.

Mounted on the shaft 11 near the top thereof is a balance cross 38 which carries weights 39 for balancing the rotor of the instrument. Turned up from this balance cross is a lug 40 and secured thereto as by soldering is the inner end of a spiral spring 41. The outer end of this spring is anchored to a downwardly-turned arm 42 of the terminal 43 which embraces the jewel 14 and is secured against the top side of the bridge 21 by a nut 44 threaded onto this jewel. Below the balance cross 38 there is a contact arm 45, preferably of platinum, which is secured as by soldering to the shaft 11. Spaced counterclockwise from the contact arm 45 is a semi-stationary contact arm 46 having an end portion lying in the path of the arm 45; this contact arm 46 constitutes preferably a thin platinum wire. The contact arm 46 is secured as by soldering to a terminal 47 which is riveted to the bridge 21. Preferably the bridge 21 is made of an insulating material such as Bakelite so that insulation is not required between it and the two terminals 43 and 47.

Figure 3:
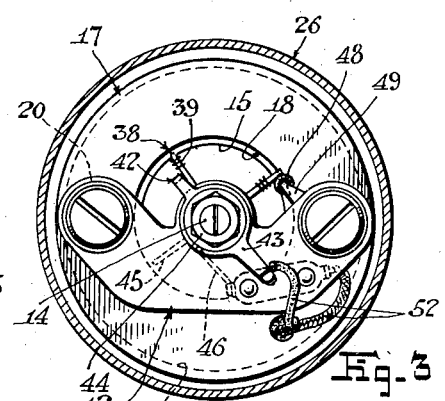
Figure 3 is a section taken substantially on the line 3—3 of Figure 1.

In the construction described in the foregoing paragraph the spring 41 serves as a biasing means for holding the rotor in an initial position defined for example by the abutment of one of the arms of the balance cross against an insulating sleeve 48 supported by an arm 49 from one of the posts 20 as shown in Figure 3. Also, the spring 41 electrically connects the moving contact arm 45 to the stationary terminal 43. (While the arm 45 is electrically connected to the shaft 11, and this shaft is typically made of metal, the arm is electrically insulated from the instrument frame by the jewels 14 and 13, which are typically made of glass.)

The contacts 45 and 46 constitute the switch for the present relay. When the coils are energized to propel the rotor counterclockwise from its initial position above described the contact arm 45 strikes the contact arm 46 and deflects the latter to make a rolling sliding contact therewith; likewise, when the current supply to the relay is cut off the rotor is returned clockwise to initial position by the spring 40 and the contacts are broken again with a relative rolling sliding movement. In view of the rolling movement between the contacts a small return force is effective to break the contacts apart even though they may have been fused together over a limited area by the current which they control.

Figure 5:
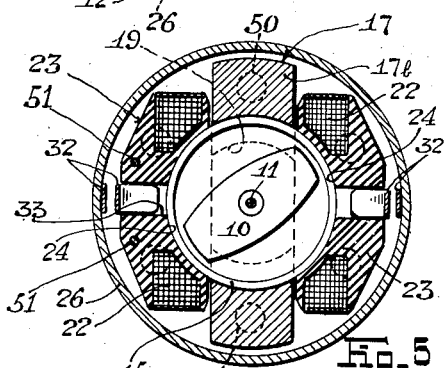
Figure 5 is a section taken substantially on the line 5—5 of Figure 1.
Figure 2:
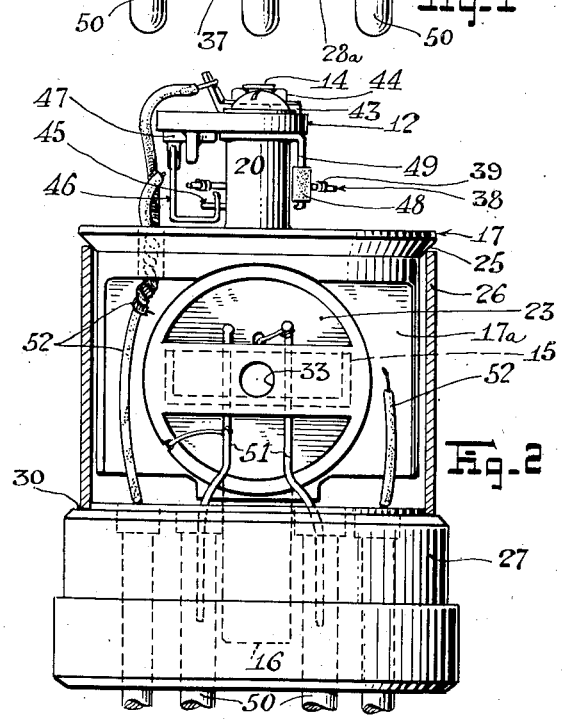
Figure 2 is a side elevation of the meter relay less the housing and showing the shield broken away.
Figure 4:
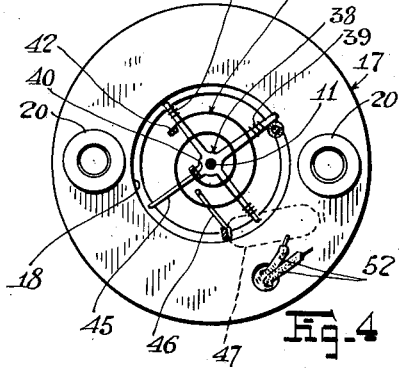
Figure 4 is a section taken substantially on the line 4—4 of Figure 1.

When the rotor is in initial position the magnet 10 lies in the position approximately shown in Figure 5 wherein its magnetic axis—which corresponds with its longitudinal geometrical axis—is at a minor fraction of a right angle— typically 30°—from the magnetic axes of the coils 22. The coils are serially connected in magnetically aiding relation and are so polarized that when energized the magnet is propelled counterclockwise. The spacing between the contact arms 45 and 46 is typically such that they close when the magnet is approximately at right angles to the axes of the coils. This is the most effective position of the magnet for closing the contacts since herein the coils have a maximum torque influence on the magnet per unit of energizing current. As a typical example, it may be noted that the present relay is designed especially for thermostatic fire-alarm systems on aircraft, and has proven to work dependably in this application despite extreme vibration and widely varying temperatures, from as little power as 25 microwatts— the power of a single thermocouple. For this application the field coils are serially connected in magnetically aiding relation and a single-pole single-throw switch is employed, as described. It will be understood, however, that for other applications the coils may be differentially connected and/or the instrument may be provided with a second semi-stationary contact such as the contact 46 so as to form a single-pole double-throw type of relay.

The present relay is adapted for socket mounting by providing the base with a series of depending pins 50. In the present example, there may be six such pins. The coils 22 are connected to four of these pins by wires 51 which are anchored in the coil spools and which extend downwardly through the pins, the wires being secured to the latter as by soldering. The other two pins are connected by a pair of twisted wires 52 which lead up through the housing at 53 to the terminals 43 and 47. Mounted on the base 27 and covering the entire instrument is a cover 54 which is made of metal or suitable plastic.

While I have herein shown and described my invention in terms of a preferred embodiment thereof, it will be understood that this embodiment is subject to changes and modifications without departure from the scope of my invention, which I endeavor to express according to the following claims.

I claim:

1. In an electrical instrument including a pivoted permanent magnet, means for generating a magnetic field to produce a torque influence on said magnet, and a cylindrical magnetic shield surrounding said magnet; means for locating said shield in concentric relation to the pivot axis of said magnet, comprising a seating member having a conical face centered at said pivot axis for locating one end of said shield; a second seating member having an annular shoulder centered at said pivot axis and adapted to fit the interior wall at the other end of said shield and further having an abutment face in a plane at right angles to said pivot axis adapted to bear against said other end of the shield; and means for clamping said seating members, in directions along said pivot axis, against the ends of said shield.

2. In an electrical instrument comprising a pivoted magnet and a surrounding magnetic shield: a frame structure for pivotally supporting said magnet and holding said shield centered in relation to the pivot axis of the magnet, comprising a main frame portion having a seat for one end of said shield, an axially located tubular element fixedly secured to said main frame portion and extending beyond said shield, a pivot bearing for said magnet removably mounted within said tubular element, a separate removable seating and centralizing member for the other end of said shield centrally apertured to receive said tubular element, means secured in said tubular element for retaining said bearing in mounted position, and separate means externally secured to said tubular element for securing said seating member to said main frame portion and clamping the same against said shield.

3. In an electrical instrument comprising a pivoted magnet and a surrounding cylindrical shield: the combination of a frame for said instrument having an integral portion forming a seat for one end of said shield; a pivot bearing for said magnet mounted removably on said frame at the other end of said shield; and a shield-locating member having an annular seat for said other end of said shield and removably secured to said frame, said locating member having an opening through which said pivot bearing is removable without disturbing the mounting of said shield and said locating member being mounted independently on said pivot bearing.

4. In an electrical instrument including a pivoted permanent magnet, electromagnetic means for producing a torque influence on said magnet, and a surrounding tubular magnetic shield: the combination of a frame for said instrument insertable into said shield and having a seat for the inner end of the shield; an axial element projecting from said frame beyond the other end of said shield; means pivotally supporting said magnet at the central axis of said frame; a member having an annular seat for the other end of said shield and having a central hole countersunk in its outer wall, said axial element engaging said hole; and a conical nut exteriorly threaded onto said axial element for clamping said member against said shield.

5. In an electrical instrument including a pivoted permanent magnet, electromagnetic means for producing a torque influence on said magnet, and a surrounding tubular magnetic shield: the combination of a frame for said instrument insertable into said shield and having a seat for the inner end of the shield, a tubular element projecting from said frame beyond the other end of said shield, a pivot bearing in said tubular element for said magnet, a shield-localizing member having an annular seat for the other end of said shield and having a central hole received by said tubular element, a nut exteriorly threaded onto said tubular element to clamp said locating member against said shield, and means threaded into said tubular element and bearing against said nut for locking the latter in place.

6. In an electrical instrument including a pivoted permanent magnet: the combination of a tubular shield surrounding said magnet and having end faces in planes at right angles to its central axis, a conical seating member centered at the pivot axis of said magnet and having its medial plane at right angles to said pivot axis for locating one end of said shield, a second seating member having a flat face at right angles to said pivot axis for abutting against the face at the other end of said shield, and clamping means for pressing the said seating members along said pivot axis against the ends of said shield.

WINSLOW B. M. CLARK.

REFERENCES CITED

The following references are of record in the file of this patent:

UNITED STATES PATENTS

| Number | Name | Date |
| --- | --- | --- |
| 698,027 | Knapp | Apr. 22, 1902 |
| 1,452,591 | Brogger | Apr. 24, 1923 |
| 2,145,821 | Wallace | Jan. 31, 1939 |
| 2,339,021 | Lingel | Jan. 11, 1944 |
| 2,345,011 | Sias | Mar. 28, 1944 |
| 2,437,726 | Davis | Mar. 16, 1948 |
| 2,446,579 | Fritzinger | Aug. 10, 1948 |